(12) United States Patent
Williams et al.

(10) Patent No.: US 8,874,883 B2
(45) Date of Patent: Oct. 28, 2014

(54) DEBUGGING OF A DATA PROCESSING APPARATUS

(75) Inventors: Michael John Williams, Cambridgeshire (GB); Richard Roy Grisenthwaite, Cambridgeshire (GB)

(73) Assignee: ARM Limited, Cambridge (GB)

( * ) Notice: Subject to any disclaimer, the term of this patent is extended or adjusted under 35 U.S.C. 154(b) by 618 days.

(21) Appl. No.: 13/137,208

(22) Filed: Jul. 28, 2011

(65) Prior Publication Data

US 2012/0079458 A1 Mar. 29, 2012

(30) Foreign Application Priority Data

Sep. 24, 2010 (GB) .................................. 1016080.2

(51) Int. Cl.
*G06F 9/30* (2006.01)
*G06F 11/36* (2006.01)

(52) U.S. Cl.
CPC ........ *G06F 11/3648* (2013.01); *G06F 9/30189* (2013.01)
USPC .......................................................... 712/227

(58) Field of Classification Search
CPC combination set(s) only.
See application file for complete search history.

(56) References Cited

U.S. PATENT DOCUMENTS

| 5,621,886 | A | * | 4/1997 | Alpert et al. ............... 714/38.13 |
| 5,948,097 | A | * | 9/1999 | Glew et al. ..................... 712/220 |
| 5,978,902 | A | * | 11/1999 | Mann ............................. 712/227 |
| 6,321,329 | B1 | | 11/2001 | Jaggar et al. |
| 7,117,352 | B1 | | 10/2006 | Giles et al. |
| 7,428,727 | B2 | * | 9/2008 | Alverson et al. .............. 717/134 |
| 7,480,797 | B2 | * | 1/2009 | McKee .......................... 713/164 |
| 2002/0042874 | A1 | * | 4/2002 | Arora ............................. 712/229 |
| 2005/0289545 | A1 | | 12/2005 | Blinick et al. |
| 2006/0048099 | A1 | | 3/2006 | Templin et al. |
| 2008/0082802 | A1 | * | 4/2008 | Muramatsu et al. .......... 712/227 |

FOREIGN PATENT DOCUMENTS

| EP | 1 124 184 | 8/2001 |
| GB | 2 395 583 | 5/2004 |
| JP | 8-263324 | 10/1996 |
| JP | 2000-330826 | 11/2000 |
| JP | 2001-249848 | 9/2001 |
| JP | 2004-171565 | 6/2004 |
| WO | WO 2004/015553 | 2/2004 |
| WO | WO 2008/061089 | 5/2008 |

OTHER PUBLICATIONS

Written Opinion of the International Preliminary Examining Authority mailed Sep. 28, 2012 in PCT/GB2011/051405.
Freescale Semiconductor, Inc. "MCF548x Reference Manual" Rev. 5, Apr. 2009, complete reference manual.

(Continued)

*Primary Examiner* — Eric Coleman
(74) *Attorney, Agent, or Firm* — Nixon & Vanderhye P.C.

(57) ABSTRACT

A data processing apparatus is provided comprising processing circuitry and instruction decoding circuitry. The data processing apparatus is capable of operating at a plurality of different privilege. Processing circuitry of the data processing apparatus imposes on program instructions different access permissions to at least one of a memory and a set of registers at different ones of the different privilege levels. A debug privilege-level switching instruction is provided and decoding circuitry is responsive to this instruction to switch the processing circuitry from a current privilege level to a target privilege level if the processing circuitry is in a debug mode. However, if the processing circuitry is in a non-debug mode the instruction decoding circuitry prevents execution of the privilege-level switching instruction regardless of the current privilege level.

25 Claims, 10 Drawing Sheets

(56) References Cited

OTHER PUBLICATIONS

Power.org, "Power.org™ Target Debug Capabilities Specification" Version 1.0, May 9, 2008, pp. 1-18.
Search Report for UK 1016080.2, dated Dec. 10, 2010.
International Search Report mailed Sep. 30, 2011 in PCT/GB2011/051405.
Freescale Semiconductor, Inc. "MCF548x Reference Manual" Rev. 5, Apr. 2009, pp. 3-2, 3-5, 3-8, 3-11, 3-12, 5-1, 8-1, 8-28 to 8-51.
Freescale Semiconductor, Inc. "ColdFire® Family Programmer's Reference Manual" Rev. 3, Mar. 2005, pp. 3-1 to 3-24, 8-1 to 8-20.
ARM Limited "ARM1176JZ-S Technidal Reference Manual" Rev. r0p7, 2009, pp. 2-3 to 2-7, 2-17 to 2-29, 6-11, 6-12, 13-10, 14-35.
Japanese Office Action mailed May 7, 2014 in JP 2013-529704 and English translation.
ARM Limited "ARM1176JZ-S Technical Reference Manual" Rev. r0p7, 2009, Chapters 2, 6, 13 & 14, 213 pages.

\* cited by examiner

| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|---|---|---|---|---|---|
| 1 | 0 | 1 | 0 | 1 | 0 | 0 | 1 | 1 | 0 | 1 | | | | | | | | | | | | | | | | | 0 | 0 | 0 | 1 | 0 |
| | | | | | | | | | | | DCPS | | | | | | ignored | | | | | | | | | | | | | target | |

"target"   Target privilege level

00   UNDEFINED

01   PL1

10   PL2

11   PL3

Table: "target" encoding in DCPS

FIG. 6

| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|----|----|----|----|----|----|----|----|----|----|----|----|----|----|----|----|----|----|----|----|----|----|---|---|---|---|---|---|---|---|---|---|
| 1  | 1  | 0  | 1  | 0  | 1  | 1  | 0  | 1  | 0  | 1  | 1  | 1  | 1  | 1  | 0  | 0  | 0  | 0  | 0  | 0  | 1  | 1 | 1 | 1 | 1 | 1 | 0 | 0 | 0 | 0 | 0 |

DRET instruction encoding, A64 instruction set

FIG. 7A

| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|----|----|----|----|----|----|----|----|----|----|----|----|----|----|----|----|----|----|----|----|----|----|---|---|---|---|---|---|---|---|---|---|
| 1  | 1  | 0  | 1  | 0  | 1  | 1  | 0  | 1  | 0  | 0  | 1  | 1  | 1  | 1  | 0  | 0  | 0  | 0  | 0  | 0  | 1  | 1 | 1 | 1 | 1 | 1 | 0 | 0 | 0 | 0 | 0 |

ERET instruction encoding, A64 instruction set

FIG. 7B

|     | 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|-----|----|----|----|----|----|----|----|----|----|----|----|----|----|----|----|----|----|----|----|----|----|----|---|---|---|---|---|---|---|---|---|---|
| SVC | 1  | 1  | 0  | 1  | 0  | 1  | 0  | 0  | 0  | 0  | 0  | comment field (ignored) | | | | | | | | | | | | | | | | 0 | 0 | 0 | 0 | 1 |
| HVC | 1  | 1  | 0  | 1  | 0  | 1  | 0  | 0  | 0  | 0  | 0  | comment field (ignored) | | | | | | | | | | | | | | | | 0 | 0 | 0 | 1 | 0 |
| SMC | 1  | 1  | 0  | 1  | 0  | 1  | 0  | 0  | 0  | 0  | 0  | comment field (ignored) | | | | | | | | | | | | | | | | 0 | 0 | 0 | 1 | 1 |

FIG. 7C

DEBUGGING OF A DATA PROCESSING APPARATUS

This application claims priority to GB Application No. 1016080.2 filed 24 Sep. 2010, the entire contents of which are incorporated herein by reference.

BACKGROUND OF THE INVENTION

1. Field of the Invention

The present invention relates to data processing. More particularly, the present invention relates to debugging of a data processing apparatus.

2. Description of the Prior Art

It is known to perform debugging of a data processing apparatus in order to determine defects in operation of data processing hardware and/or software. As processors become more complex with more data processing elements on a single data processing integrated circuit, perhaps including multiple processors configurable to run multiple operating systems, the process of debugging is becoming more complex and challenging. However, debugging is an important phase in software and system design to identify and eliminate defects.

It is also known to provide a data processing apparatus capable of operating at a plurality of processor operating states where the processing circuitry imposes on program instructions different access permissions to at least one of a memory and set of registers at the different privilege levels. For example, a user mode could be provided at which program instructions have access permissions to a subset of control registers and a system mode could be provided where the program instructions have access permission to a larger subset of control registers. It is important that operation of the data processing apparatus in all of the possible modes should be thoroughly debugged.

It is known in the ARM v7 processor architecture to provide a special debug mode, which the processor enters to process a debug event, such as a breakpoint or watchpoint match. When in this debug mode the processor reads instructions from an instruction transfer register, which is controlled by a debugger connected to the data processing apparatus via a debug port. Depending on the choice of instruction, the debugger is able to view and modify the contents of the processor registers and view and modify the contents of memories connected to the processor. Thus the debugger is able to effectively debug software programs and diagnose other defects such as defects in the design of the data processing apparatus itself.

Accordingly, there is a requirement to provide a more efficient way of causing the data processing apparatus to transition between different operating states.

SUMMARY OF THE INVENTION

According to a first aspect the present invention provides a data processing apparatus comprising:

processing circuitry for processing data, said processing circuitry being configurable to operate at a plurality of privilege levels wherein at different privilege levels said processing circuitry imposes on program instructions different access permissions to at least one of a memory and a set of registers;

instruction decoding circuitry responsive to program instructions to generate control signals for controlling said processing circuitry to perform said data processing;

wherein said program instructions comprise a debug privilege-level switching instruction, said instruction decoding circuitry being responsive to said debug privilege-level switching instruction to perform the following:

(i) if said processing circuitry is in a debug mode to switch said processing circuitry from a current privilege level to a target privilege level; and (ii) if said processing circuitry is in a non-debug mode, to prevent execution of said debug privilege-level switching instruction regardless of said current privilege level.

The present invention recognises that providing a dedicated privilege-level switching instruction that, upon execution in a debug mode, switches the processing circuitry from a current privilege level to a target privilege level and yet prevents execution of the privilege-level switching instruction regardless of the current privilege level when the processing circuitry is in a non-debug mode. This provides a useful way of enabling the processor to be put into different operating states when in a debug mode without resorting to complicated overloading of a non-debug mode instruction. The ability to change the processor to operate at different privilege levels when in the debug mode is useful because when the processor is operating at different privilege levels it has a different view of, for example, system registers and memory and thus different privilege levels correspond to different processor operating states, which it desirable to be able to access in a debug mode.

For example, in a data processing apparatus that implements virtualisation and thus has a hypervisor mode, the hypervisor will operate at a different privilege level from a guest operating system running on the data processing apparatus. Furthermore, provision of a dedicated debug privilege-level switching instruction that is only defined in a debug mode allows the instruction to perform switches between different privilege levels in a manner that is ideally suited to the peculiarities of the debug mode. For example, the dedicated debug privilege-level switching instruction can be implemented such that no branches are performed in order to switch between different privilege levels because branches, whilst typically implemented in a non-debug mode as part of a privilege-level switching instruction in order to maintain correct separation between the privilege levels, are undesirable in a debug mode. This is because whereas in a non-debug mode, program instructions are fetched from system memory, in a debug mode typically debug instructions are fetched from a dedicated instruction transfer register controlled by the debugging circuitry. A branch, in particular a branch associated with a change in privilege level, typically operates by (a) generating a branch target address, (b) writing this address to a program counter register, (c) flushing the instruction pipeline, and (d) fetching instructions from the memory address written to the program counter register. For example, in the case of privilege-level incrementing instructions in non-debug mode, the branch target address is fixed, and in the case of privilege-level decrementing instructions in non-debug mode, the branch target address is read from an address link register.

Flushing the instruction pipeline and restarting instruction fetch from memory is inappropriate in a debug mode, as all instructions are fetched from the instruction transfer register. To avoid complicating the processor design by modifying the operation of branches in a debug mode, it is preferable to avoid branches altogether. Thus the ability to provide privilege level switching instruction tailored for execution in a debug mode rather than using an overloaded instruction that has one function in a normal mode and a different function in a debug mode simplifies processor design.

It will be appreciated that the debug privilege-level switching instruction could be implemented in order to switch between different processor operating states at the same privilege level such that the target privilege level is the same as the current privilege level. For example, a switch could be performed between two different interrupt modes such as an IRQ mode and an FIQ mode at the same privilege level. However, according to some embodiments, the target privilege level is different from the current privilege level. This enables switching in the debug mode between, for example, a mode in which the processor is executing operating system instructions and a mode in which the processor is executing program application instructions. This is useful because modern processors are configured to frequently switch between different operating states executing different categories of program instructions.

It will be appreciated that the target privilege level could be encoded in the debug privilege-level switching instruction in a number of different ways, for example, by a field of the privilege-level switching instruction specifying a memory location from which the target privilege level can be read. However, in one embodiment, the target privilege level is directly encoded within a field of the debug privilege-level switching instruction itself. This enables the target privilege level to be derived in a straightforward manner so that the instruction can be efficiently executed.

In an alternative embodiment, the data processing apparatus comprises at least one dedicated target register providing an indication of the target privilege level. The debug privilege-level switching instruction reads the target privilege level from the dedicated target register. This is a convenient way to implement switching to a target privilege level. In some such embodiments the data processing apparatus comprises a plurality of dedicated target registers, each of the dedicated target registers storing a corresponding target privilege level and the processing circuitry is configured to select one of the plurality of dedicated target registers from which to read the target privilege level depending upon the current privilege level. This is a convenient and efficient way of setting up switches between different ones of a plurality of different privilege levels because it enables a number of switching options to be defined once in advance and an appropriate one of those options to be selected as required depending upon the current debug mode privilege level.

It will be appreciated that the privilege-level switching instruction could be arranged to perform one or both of switching up from a lower privilege level to a higher privilege level or switching down from a higher privilege level to a lower privilege level. In one embodiment, the debug privilege-level switching instruction comprises a dedicated privilege-incrementing instruction for which the target privilege level is required to correspond to a higher privilege level than the current privilege level. Providing a dedicated instruction that increments that privilege level is a convenient way of decoupling switching up between privilege levels from switching down between privilege levels. In other embodiments, the debug privilege-level switching instruction comprises a privilege-decrementing instruction where the target privilege level is required to correspond to a lower privilege level than the current privilege level. The privilege-incrementing instruction and privilege-decrementing instruction can conveniently be used in a complementary manner for performing any desired privilege-level switch when in the debug mode. Alternatively, these two different instructions can be decoupled such that only one of the privilege-level incrementing instruction or the privilege-level decrementing instruction can be provided in a given data processing apparatus.

In one embodiment, the program instructions comprise a first type of debug privilege-level switching instruction corresponding to a privilege-level incrementing instruction in which the target privilege level is required to correspond to a higher privilege level than the current privilege level and a second type of debug privilege-level switching instruction corresponding to a privilege-decrementing instruction for which the target privilege level is required to correspond to the lower privilege level than the current privilege level.

In some embodiments the program instructions comprise a standard privilege-level switching instruction and the instruction decoding circuitry is responsive to the standard privilege-level switching instruction to perform a switch of the processing circuitry from the current privilege level to the target privilege level if the processing circuitry is in a non-debug mode. This conveniently decouples the task of privilege switching when the data processing apparatus is in a non-debug mode from the task of privilege switching when the data processing apparatus is in a debug mode. In some such embodiments, the debug privilege-level switching instruction and the standard privilege-level switching instruction have identical instruction bit-widths and isomorphic encodings.

The isomorphic encodings are implemented such that a first bit-set of the debug privilege-level switching instruction and the standard privilege-level switching instruction have substantially identical bit patterns whilst a second bit-set of the debug privilege-level switching instruction and the standard privilege-level switching instruction has substantially non-identical bit patterns and wherein the second bit-set is smaller than the first bit-set. Arranging the standard mode privilege level switching instruction and the debug mode privilege-level switching instruction such that the majority of bits in the respective instruction encodings are identical provides a convenient way of implementing the two instructions and the isomorphic encoding simplifies decoding these instructions and thus simplifies the data processing circuitry. In some such embodiments having isomorphic encodings, the second bit set comprises a single bit. Arranging that only a single bit in the entire instruction encoding differs between the instructions having corresponding functions in the debug mode and the non-debug mode provides a sufficiently close relationship between the instructions in the two different modes to enable the decoding circuitry to readily identify the relationship between the different instructions.

It will be appreciated that the debug privilege-level switching instruction could be used in any type of data processing apparatus in which it is desired to perform debugging, including data processing apparatuses that do not make use of virtual memory. However, in some embodiments, the current privilege level corresponds to an operating state of the processing circuitry that implements a first virtual memory address to physical memory address translation scheme and the target privilege level corresponds at an operating state of the processing circuitry that implements a second virtual memory address to physical memory address translation scheme. The first virtual memory address to physical memory address translation scheme is different from the second virtual memory address to physical memory address translation scheme. Having different privilege levels implementing different virtual to physical memory address translation schemes means that there is a clear requirement when the data processing apparatus is in a debug mode to provide the capability of switching between different privilege levels having different address translation schemes so that operation of the data processing apparatus at each of the different privilege levels can be efficiently debugged.

It will be appreciated that differences between the different privilege levels could amount only to different access permissions to memory and not different access permissions to any of the processor registers. However, in some embodiments the data processing circuitry comprises a plurality of system registers and the current privilege level has a first set of accessibility criteria associated with the plurality of system registers whilst the target privilege level has a second different set of accessibility criteria associated with the plurality of system registers. Similarly to the implementation of different virtual to physical address translation schemes at the different privilege levels, the different views that the data processing apparatus has of system registers when operating at different privilege levels makes the importance of the capability to conveniently and efficiently switch between different privilege levels when in a debug mode clear.

It will be appreciated that the debug privilege-level switching instruction could be prevented from being executed by the processing circuitry when the data processing apparatus is in a non-debug mode regardless of the current privilege level in any one of a number of different ways provided that the debug privilege-level switching instruction is appropriately defined and conveniently decouples privilege level switching in a non-debug mode from privilege-level switching in a debug mode. However, in some embodiments, if the data processing apparatus is in a non-debug mode the debug privilege-level switching instruction is undefined and generates a software exception. This is a convenient way of ensuring that the debug privilege-level switching instruction is only executed in the debug mode.

It will be appreciated that the plurality of privilege levels could correspond to any one of a number of different types of operating state of the data processing apparatus. However in some embodiments a first of the plurality of privilege levels corresponds to an application layer and a second of the plurality of privilege levels corresponds to an operating system layer. In some embodiments, one of the plurality of privilege levels corresponds to a hypervisor layer. Furthermore in some embodiments one of the plurality of privilege levels corresponds to a security monitoring layer. This conveniently enables switching in and out of a security monitoring layer which is useful in a data processing apparatus capable of implementing a secure mode of operation.

It will be appreciated that any one of a number of different combinations of the plurality of privilege levels could be provided in the data processing apparatus. However, in some embodiments in which a first of the plurality of privilege levels corresponds to an application layer and a second of the plurality of privilege levels corresponds to an operating system layer a third of the plurality of privilege levels corresponds to a security monitoring layer, but a hypervisor layer is absent. This conveniently enables a secure mode to be implemented without the potential compromise to security that a hypervisor layer may present.

It will be appreciated that the debug privilege-level switching instruction could be used indiscriminately to switch up between any two of the plurality of privilege levels or down between any two of the plurality of privilege levels without any of the required switches being prevented. However, in some embodiments the debug privilege-level switching instruction is configured to trigger a check prior to implementing the switch between privilege levels to determine whether the switch from the current privilege level to the target privilege level should be permitted and to prevent the switch from the current privilege level to the target privilege level when the check fails. This also enables the data processing circuitry to conveniently check whether in the case of a dedicated privilege incrementing instruction that it is possible to move up to a higher privilege level and the instruction is not being used to move down between privilege levels and for a privilege-decrementing instruction that it is possible to move down from the current privilege level to a lower privilege level and no attempt is being made to increase the privilege level using the instruction.

In some such embodiments where the check of whether the switch from the current privilege level to the target privilege level should be permitted the target privilege level corresponds to a security-monitoring layer and the check is a security check. This provides an efficient mechanism via which to implement a security check. In other embodiments that implement the check prior to implementing the switch between different privilege levels, the processing circuitry is configurable so that in a higher one of the plurality of privilege levels the processing circuitry can define at least one lower one of the plurality of privilege levels to be inaccessible and wherein the check is an accessibility check for permission to access the target privilege level. This provides the flexibility of enabling only a subset of privilege levels to be accessible to the data processing circuitry when the data processing apparatus is in certain operating states such as a secure operating state.

According to a second aspect the present invention provides a data processing method for performing on a data processing apparatus having processing circuitry being configurable to operate at a plurality of privilege levels wherein at different privilege levels said processing circuitry has different access permissions to at least one of a memory and a set of registers, said data processing method comprising the steps of:

in response to program instructions including a debug privilege-level switching instruction, generating control signals for controlling processing circuitry to process data;

in response to said debug privilege-level switching instruction, generating control signals for controlling said processing circuitry to perform a privilege-level switching operation comprising:

(i) if said processing circuitry is in a debug mode to switch said processing circuitry from a current privilege level to a target privilege level; and (ii) if said processing circuitry is in a non-debug mode, to prevent execution of said debug privilege-level switching instruction regardless of said current privilege level.

According to a third aspect the present invention provides a data processing apparatus comprising:

means for processing data, said means for processing data being configurable to operate at a plurality of privilege levels wherein at different privilege levels said processing circuitry has different access permissions to at least one of a memory and a set of registers;

means for decoding program instructions responsive to program instructions to generate control signals for controlling said means for processing to perform said data processing;

wherein said program instructions comprise a debug privilege-level switching instruction, said means for decoding program instructions being responsive to said debug privilege-level switching instruction to perform the following:

(i) if said processing circuitry is in a debug mode to switch said processing circuitry from a current privilege level to a target privilege level; and (ii) if said processing circuitry is in a non-debug mode, to prevent execution of said debug privilege-level switching instruction regardless of said current privilege level.

BRIEF DESCRIPTION OF THE DRAWINGS

FIG. 6 schematically illustrates an instruction encoding for the DCPS instruction that is used to increase the privilege level in the debug mode;

FIG. 7A schematically illustrates an encoding for the privilege level decrementing instruction DRET for the debug mode;

FIG. 7B schematically illustrates an instruction encoding for the ERET instruction, which is the non-debug mode privilege level decrementing instruction;

FIG. 7C schematically illustrates instruction encodings for the SVC, HVC, and SMC instructions, which are the non-debug mode privilege level incrementing instructions;

DESCRIPTION OF EMBODIMENTS

Figure 1:
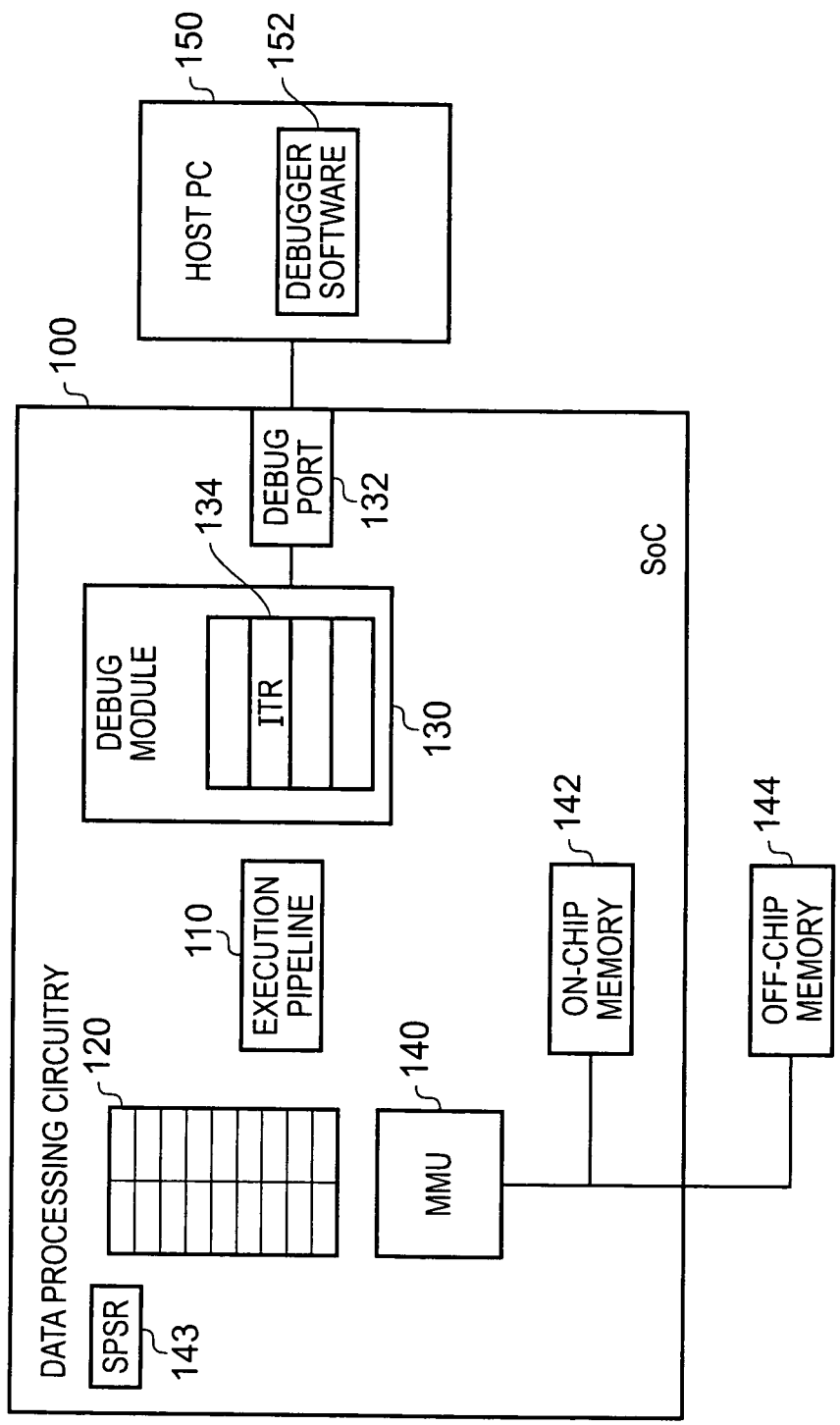
FIG. 1 schematically illustrates a data processing apparatus according to an embodiment of the present invention.

FIG. 1 schematically illustrates a data processing apparatus according to an embodiment of the present invention. The data processing apparatus comprises an integrated circuit 100 comprising a number of processing components forming a "System-On-Chip". In particular, the integrated circuit 100 comprises an execution pipeline 110, a set of general purpose registers 120, a debug module 130, a debug port 132, a memory management unit 140 and an on-chip memory 142. The data processing apparatus 100 also has access to an off-chip memory 144.

The debug port 132 of the data processing apparatus 100 is connected to a host personal computer 150 configured to run debugger software 152 to assist in debugging of the data processing circuitry 100. The data processing circuitry 100 further comprises a saved program status register (SPSR) 143 that is used by a subset of the debug privilege-level switching instructions according to the present technique in order to store a target privilege level that the data processing apparatus should switch to from a current privilege level. The saved program status register 143 is banked according to privilege level such that there is a specific register that will be read for each of a plurality of different privilege levels in which the data processing circuitry 100 is capable of operating. The target privilege level will be read from one of the plurality of saved program status registers 143 according to the current privilege level at the point at which the debug privilege-level switching instruction is actually executed. The saved program status registers 143 provide an indication of the target privilege level. In this embodiment, the target privilege level is encoded within the relevant one of the saved program status registers 143 as a mode number. However, in alternative embodiments, the target privilege level is directly represented in the saved program status registers 143. In this particular embodiment there are four different privilege levels, but this will be explained in more detail with reference to FIG. 2.

The debug module 130 comprises an instruction transfer register 134. When the data processing circuitry 100 is in a non-debug mode then instructions are read from either on-chip memory 142 or off-chip memory 144 and supplied to the execution pipeline 110. However, when the data processing apparatus is in a debug mode the instructions are not read from either of the memories 142, 144, but instead instructions are stored in the instruction transfer register 134 and supplied from there to the execution pipeline 110. The debugger software 152 on the host PC 150 controls the instruction transfer register 134 via the debug port 132 to load appropriate debug instructions into the instruction transfer register 134.

The data processing apparatus 100 of this embodiment has a RISC (Reduced Instruction Set Computing) architecture, which is a load-store architecture in which instructions that process data operate only on registers and are separate from instructions that access memory. The data processing apparatus 100 is a pipelined data processing apparatus and the execution pipeline 110 comprises a fetch stage, a decode stage and an execute stage (not shown). The set of general purpose registers 120 is used to store operands for and results of instructions executed by the execution pipeline 110. The data processing apparatus 100 is configured to execute a plurality of different instruction types. In particular, the data processing circuitry 100 can execute both instructions operating on 32-bit wide data, referred to as 32-bit program instructions, and instructions operating on 64-bit wide data, referred to as 64-bit program instructions. Furthermore, different types of 32-bit program instructions can be executed. A first type of 32-bit program instructions is an "A32" instruction set whilst a second type of 32-bit program instructions is a "T32" instruction set comprising a more compact version of the A32 instruction set. Despite the fact that many of the T32 instructions are 16-bit wide instructions, they operate on 32-bit data and so are 32-bit program instructions. A third type of 32-bit instruction is a "T32EE" instruction set which, similarly to the T32 instruction set, is a compact set of instructions, but this set of instructions has extensions to enable conversion between Java bytecodes and T32 instructions and thus supports execution of virtual machines by the data processing circuitry 100. Although in this embodiment only a single 64-bit instruction set can be executed, it will be appreciated that in alternative embodiments a plurality of 64-bit instruction sets could be provided.

To support execution of both 32-bit and 64-bit program instructions the general purpose registers 120 are variable-width registers configured such that when the data processing circuitry 100 is operating in a 32-bit mode, that is executing 32-bit program instructions then the registers 120 are viewed by the data processing apparatus as a set of 32-bit registers. OR the other hand when the data processing apparatus 100 is executing in a 64-bit mode and executing 64-bit program instructions, the data processing apparatus 100 is configured such that the registers 120 are viewed as 64-bit registers and use their full 64-bit width. The memory management unit 140 controls access to on-chip memory 140 and off-chip memory 142 according to the current operating state of the data processing apparatus 100, such that in a user mode a smaller subset of memory locations are accessible to the data processing circuitry 100 than are accessible in a system mode. In a secure mode of the data processing apparatus all of the memory locations that are available in the user mode and the system mode are available and in addition a special set of secure memory locations is accessible to the data processing circuitry 100. The memory management unit 140 is responsible for handling all access requests to memory by the execution pipeline 100 and its functions include the translation of virtual memory addresses to physical memory addresses, memory protection, cache control and bus arbitration.

In the embodiment of FIG. 1, the host personal computer 150 that operates as a debugger unit is situated off-chip relative to the data processing circuitry 100. However, in alternative embodiments the functionality of the host personal computer 150 of running the debugger software 152 is provided in debug processing circuitry that is located on the same System-on-Chip as the data processing circuitry 100 of FIG. 1 such that the data processing circuitry 100 does not form the entire System-on-Chip.

Figure 2:
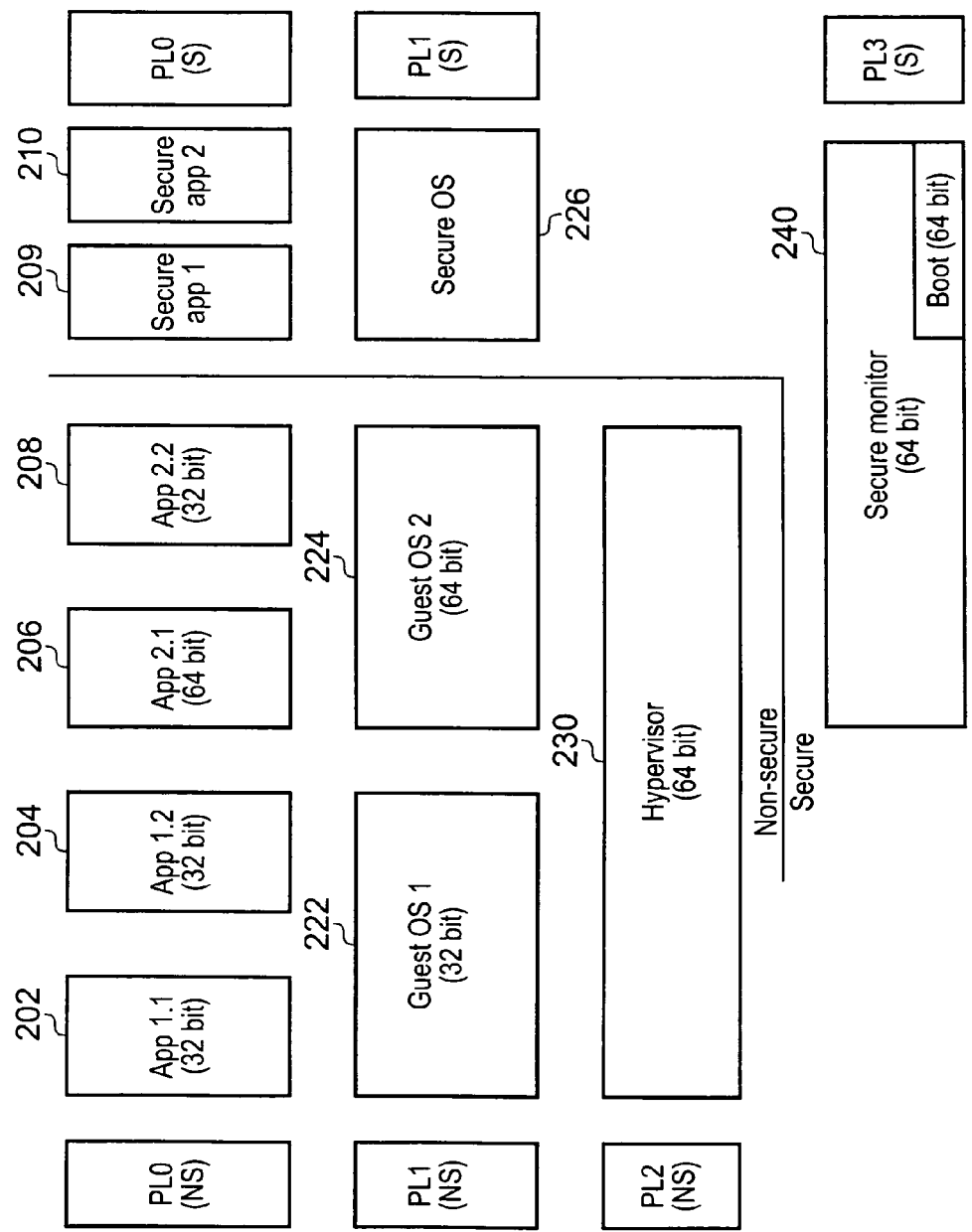
FIG. 2 schematically illustrates a plurality of different operating states of the data processing apparatus of FIG. 1 corresponding to a plurality of different privilege levels.

FIG. 2 schematically illustrates a plurality of different operating states of the data processing apparatus 100 of FIG. 1 corresponding to a plurality of different privilege levels. Respective privilege levels correspond to respective different hierarchical layers of software executing on the data processing apparatus 100.

There are four distinct privilege levels in the arrangement of FIG. 2 i.e. PL0, PL1, PL2 and PL3, with PL0 being the lowermost privilege level and PL3 being the uppermost privilege level. Privilege level PL0 corresponds to an application layer of the software hierarchy and six different program applications are illustrated corresponding to PL0, each of which can be run on the data processing apparatus 100. The next highest privilege level PL1 corresponds to an operating system software hierarchical layer and in this case three different operating systems are illustrated: a first guest operating system 222 that is a 32-bit operating system; a second guest operating system 224 that is a 64-bit operating system; and a third secure operating system 226 that has special security features. The next privilege level PL2 corresponds to a hypervisor software layer. A hypervisor software application 230 provided, which in this case is a 64-bit program that is used allow both a first guest operating system 222 and a second guest operating system 224 both have access to the non-secure data processing resources.

The hypervisor 230 is part of a virtualisation system, which allows the first guest operating system 222 and the second guest operating system 224 to concurrently execute on the same data processing apparatus, with each operating system having no knowledge that the other operating system is concurrently executing there. The hypervisor 230 controls implementation of a Virtual Translation Table Base Register (VTTBR) that controls how virtual to physical address translation is performed in both the application system layer corresponding to the lowermost privilege level PL0 and the operating system layer corresponding to the next highest privilege level PL1. Since bugs in operating of the data processing apparatus could potentially exist at any layer of the software hierarchy, the ability to switch between the four different privilege levels when the data processing apparatus is in a debug mode is important for proper debugging of the data processing circuitry.

The uppermost privilege level PL3 corresponds to a secure monitor 240 comprising 64-bit program code. Note that when the data processing apparatus 100 is operating in a secure mode the secure equivalent of the hypervisor 230 is absent. Thus, effectively there are only three privilege levels in a secure mode: PL0, PL1 and PL3. The hypervisor 230 is not required when operating in a secure mode and only the secure operating system 226 can be run in the secure mode. At the lowermost privilege level PL0 a first 32-bit program application 202 and a second 32-bit program application 204 both execute on top of the 32-bit first guest operating system 222. A third program application 206 which is a 64-bit application and a fourth program application 208, which is a 32-bit program application both execute on the 64-bit second guest operating system 224.

Figure 3:
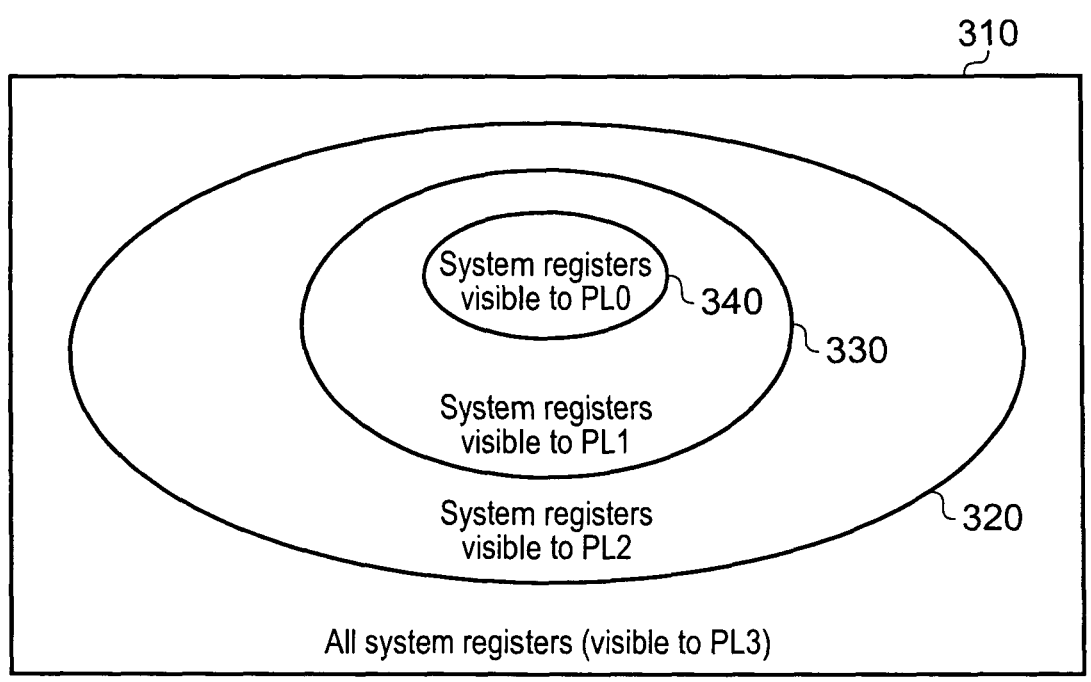
FIG. 3 schematically illustrates how at different ones of the privilege levels PL1, PL2 and PL3 of FIG. 2, the data processing apparatus has different access permissions to the set of system registers.

FIG. 3 schematically illustrates how at different ones of the privilege levels PL1, PL2 and PL3 of FIG. 2, the data processing apparatus 100 has different access permissions to the set of system registers. Note that at different privilege levels the processing circuitry will also likely have different access permissions to the full set of on-chip and off-chip memory locations 142, 144 although this is not illustrated in FIG. 3.

Referring to FIG. 3, a full set of system registers is visible to the data processing apparatus at the highest privilege level PL3 corresponding to the secure monitor. A first subset of system registers are visible to the data processing apparatus at privilege level PL2 corresponding to the hypervisor layer whilst a second subset of system registers 330, itself forming a subset of the system registers visible to PL2 is visible to the data processing apparatus 100. A third, even smaller subset 330 of system registers is visible to the data processing apparatus at the privilege level PL1 corresponding to the operating system software hierarchical layer. Thus it can be seen that different privilege levels correspond to different levels of accessibility to the system registers. Finally, a fourth, smallest, subset 340 of system registers visible to the data processing apparatus at the privilege level PL0 corresponding to the application software hierarchical layer. It will be appreciated that in some implementations, this set may be the empty set.

Figure 4:
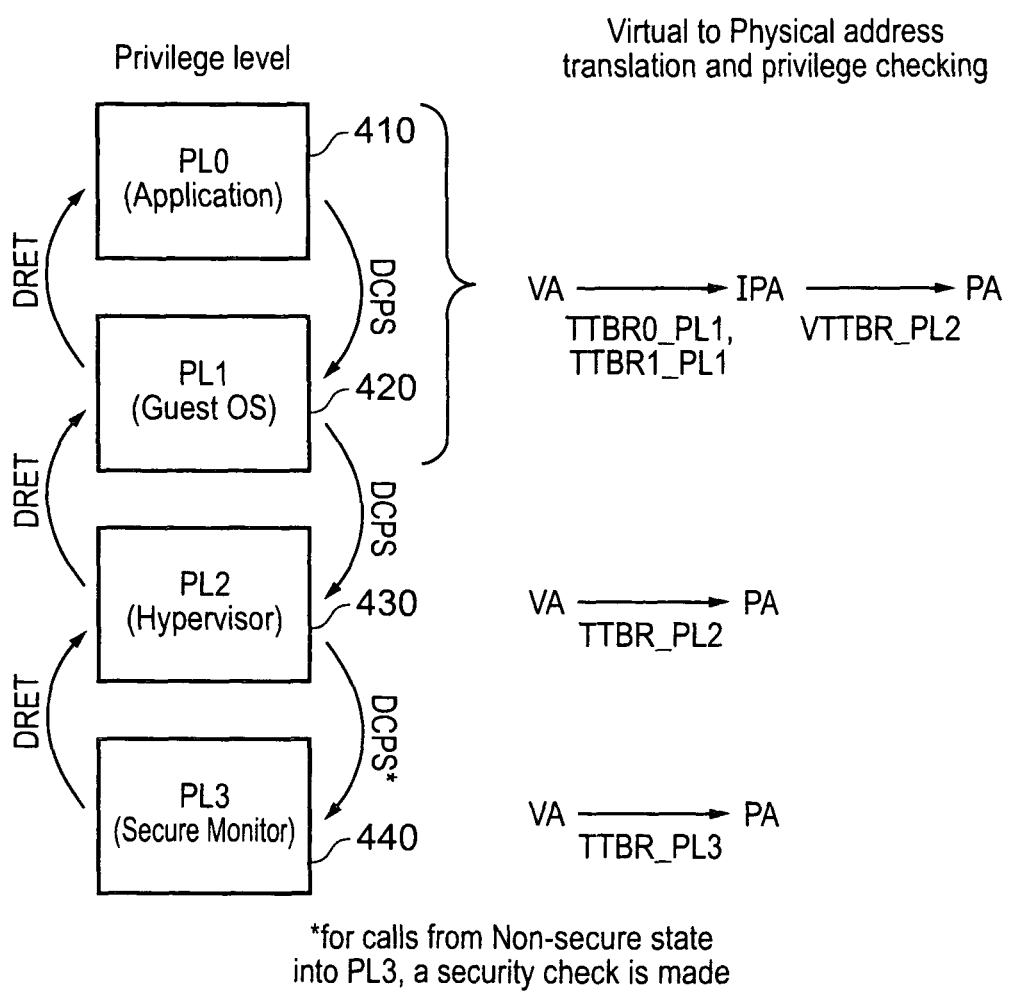
FIG. 4 schematically illustrates how two different debug privilege-level switching instructions according to the present technique are used to switch the data processing apparatus between different ones of the four different privilege levels.

FIG. 4 schematically illustrates how two different debug privilege-level switching instructions according to the present technique are used to switch the data processing apparatus between different ones of the four different privilege levels. FIG. 4 comprises: an application layer 410 corresponding to the lowermost privilege level PL0; a guest operating system layer 420 corresponding to the next privilege level PL1; a hypervisor layer 430 corresponding to PL2; and a secure monitor layer 440 corresponding to the uppermost privilege level PL3. As shown in FIG. 4, each of the privilege levels PL0, PL1, PL2 and PL3 implement different virtual to physical address translation schemes. In particular, at privilege levels PL0 and PL1, the virtual to physical address translation is a two-stage translation that involves reference to both (i) a pair of banked Translation Table Base Registers (TTBR0_PL1 and TTBR1_PL1; TTBR0_PL1 being a pointer to a hierarchy of page tables used for translating low virtual addresses, and TTBR1_PL1 being a pointer to a hierarchy of page tables used for translating high virtual addresses). In FIG. 4, PL0 and PL1 are in the non-secure mode, and hence this translation produces an intermediate physical address (IPA) from the incoming virtual address (VA); and (ii) reference to a Virtual Translation Table Base Register (VTTBR_PL2) to convert the intermediate physical address to the final physical address (PA). The virtual translation table base register is provided by the hypervisor 430, and allows the hypervisor to hide each guest operating system from other guest operating systems.

Since the hypervisor 430 at privilege level PL2 controls the virtual translation table base register, when the data processing apparatus is executing program instructions corresponding to the hypervisor privilege level PL2, the virtual to physical address translation involves a direct translation from the virtual address to the physical address without generating an intermediate physical address. Thus the virtual to physical address translation at the hypervisor privilege level PL2 involves a separate banked translation table base register, TTBR_PL2, and not the virtual translation table base register. This allows the hypervisor to hide itself from all guest operating systems.

The secure monitor 440 at privilege level PL3 has access to special secure physical addresses which are not accessible to PL2, or to PL1 and PL0 when operating in the non-secure mode. The secure monitor is not subject to the control of the hypervisor, as it operates at a higher privilege level to it. Thus the virtual to physical address translation at secure monitor privilege level PL3 involves a separate banked translation table base register, TTBR_PL3, and not the virtual translation table base register.

In the secure mode, where the hypervisor 430 is not present, the address translation at PL0 and PL1 uses TTBR0_PL1 and TTBR1_PL1 to directly translate virtual addresses to physical addresses without generating intermediate physical addresses, and hence without using the virtual translation table base register. These physical addresses can also be secure physical addresses.

As shown in FIG. 4 a dedicated "DRET" instruction corresponding to a debug privilege-decrementing instruction is used to enable the data processing apparatus 100 of FIG. 1 to make a transition between a current higher privilege level to a target lower privilege level. For example if the data processing apparatus is currently in executing instructions from the secure monitor 440 at privilege level PL3 then execution of the DRET instruction can be used to transition the system down to the hypervisor layer 430 corresponding to PL2. If the system is currently at the hypervisor level 430 corresponding to PL2 then execution of the DRET instruction can be used to transition the system down to the privilege level PL1 corresponding to the guest operating system 420. If the system is currently at the guest operating system level 420 corresponding to PL1 then execution of the DRET instruction can be used to transition down to the application layer 410 corresponding to PL0. Although FIG. 4 shows that the DRET instruction involves transitions from a current higher privilege level PL3 down one privilege level to the next highest privilege level, the present invention is in no way limited to this and the target privilege level for the DRET instruction can comprise the same or any lower privilege level and not just the next lowest privilege level.

The DRET instruction takes the target privilege level from an appropriate one of the saved program status registers 143, which are banked according to the privilege level. Thus if the data processing apparatus is currently at PL3 when the DRET instruction is executed, SPSR_PL3 is read to determine the appropriate target privilege level. When the data processing apparatus is currently at the hypervisor privilege level PL2 then the saved program status register SPSR_PL2 is read to determine the appropriate target privilege level. Similarly when the data processing apparatus is currently at the guest operating system privilege level PL1, then the target privilege level is read from SPSR_PL1. When the data processing apparatus is currently at the privilege level PL0 corresponding to the lowest privilege level and the application layer 410 there is no lower privilege level and thus execution of the instruction DRET when at the lowermost privilege level PL0 will not be permitted. A check will be performed during execution of DRET to check that the data processing apparatus is not currently at the lowest privilege level PL0, since there is no permissible target privilege level below PL0.

Also shown in FIG. 4 is a privilege level incrementing instruction "DCPS". This instruction, instead of using the saved program status register SPSR 143 of FIG. 1 takes the desired target privilege level from an immediate field within the encoding of the instruction itself. As shown in FIG. 4, the DCPS instruction can be used to make a transition from PL0 to PL1 or a transition from PL1 to PL2 or a transition from PL2 to PL3. There is no well-defined target privilege level if the DCPS instruction is executed when the data processing apparatus is already at the highest privilege level PL3 and a check is performed to make sure that there is indeed a higher privilege level to which to transition when executing the DCPS instruction. The DCPS instruction can be used to jump from a current privilege level to any higher privilege level e.g. from PL0 directly to PL3 or to PL2 such that more than one privilege level can be jumped by a single execution of the DCPS instruction. The fact that there are different virtual to physical address translations at different privilege levels means it is important that the data processing apparatus should be able to switch between privilege levels when in a debug mode to ensure that the appropriate virtual to physical address translation scheme is applied when executing debug instructions.

Note that the privilege-level incrementing instruction DCPS and the privilege-level decrementing instruction DRET are only executed when the data processing apparatus is in a debug mode and both of these instructions are undefined in a non-debug mode. Attempting execution of these two instructions whilst in a non-debug mode gives rise to a software exception.

Figure 5:
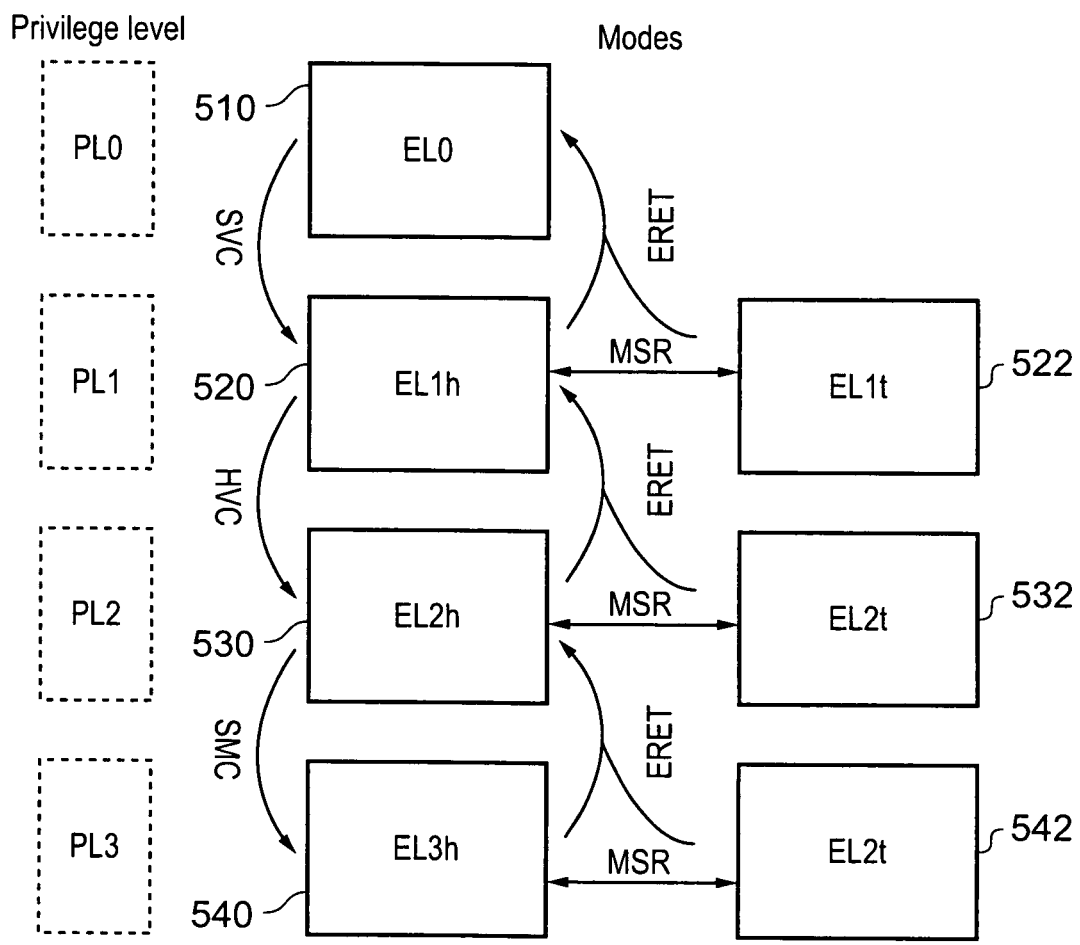
FIG. 5 schematically illustrates a plurality of non-debug mode privilege level shifting instructions that are used in the data processing apparatus of FIG. 1 to complement the debug mode privilege level switching instructions DCPS and DRET illustrated in FIG. 4.

FIG. 5 schematically illustrates a plurality of different operating modes of the data processing apparatus 100 that can be entered at the four different privilege levels PL0, PL1, PL2 and PL3. FIG. 5 also illustrates a plurality of non-debug mode privilege level shifting instructions that are used in the data processing apparatus of FIG. 1 to complement the debug mode privilege level switching instructions DCPS and DRET illustrated in FIG. 4. In the non-debug mode (or "normal" mode) the data processing apparatus can operate in one of four different privilege levels similarly to the situation in the debug mode. At the lowest privilege level PL0 the data processing apparatus operates in the unprivileged EL0 mode 510. At the next highest privilege level PL1 the data processing apparatus can operate in one of two different processing modes i.e. an EL1$h$ exception handling mode 520 and an EL1$t$ thread mode 522. Similarly, at the next privilege levels PL2 there is the choice of the EL2$h$ exception handling mode 530 and the EL2$t$ thread mode 532; and at the PL3 privilege level, the EL3$h$ exception handling mode 540 and the EL3$t$ thread mode 542.

FIG. 5 shows four different privilege level changing instructions that can be used in the non-debug mode. The instructions "SVC", "HVC" and "SMC" are all non-debug mode privilege-level incrementing instructions. The SVC instruction has a target of the privilege level PL1, the HVC instruction has a target of PL2, whilst the SMC instruction has a target privilege level of PL3. Thus the privilege level transitions performed by each of these three instructions are defined according to the target privilege levels. The SVC, HVC and SMC instructions perform transitions between different privilege levels in a non-debug mode by performing a branch to an exception vector address. Thus they are system call instructions that allow a controlled entry into a higher privilege level. If the instruction is executed at the target privilege level, or a higher privilege level, then the instruction does not change privilege level. The use of such branch instructions is undesirable when the data processing apparatus is in a debug mode because the debug instructions are fetched from the Instruction Transfer Register 134 of FIG. 1 when the data processing apparatus is in a debug mode. The SVC, HVC and SMC non-debug mode privilege level incrementing instructions can be executed when the data processing apparatus is operating in both a 64-bit mode and a 32-bit mode. The SVC, HVC and SMC instructions have similar encodings in the 64-bit A64 instruction set and they differ only by an immediate field in the encoding which specifies the target exception level.

The instruction "ERET" which is shown in FIG. 5 is a privilege level decrementing instruction used to move down from a privilege level to a target lower privilege level and can be used, for example, to effect a transition from the EL2$h$ mode 530 to the EL1$t$ mode 522. The ERET instruction takes its target privilege level from a saved program status register 143 which is banked according to privilege level and branches to an address in a system register ELR (not shown in FIG. 1), which is also banked. That is, ERET is also a branch instruction. In 64-bit mode ERET is available at each of the privilege levels PL1, PL2 and PL3, although in 32-bit mode, ERET is only available at PL2, and different privilege-decrementing instructions must be used in 32-bit modes.

There may be other privilege incrementing and decrementing instructions, for example, a privilege-decrementing instruction that reads the target privilege level and address from memory rather than registers. In order to ensure correct operation of the system in non-debug mode, it is advantageous for such instructions to be branches. The branch allows the change in privilege level to be synchronized across the system.

A further instruction is provided for use only in 64-bit operation of a non-debug mode of the data processing apparatus. This instruction is "MSR SPSel", shown in FIG. 5 as just "MSR". This instruction allows software to switch between different modes within the same privilege level. For example, from the EL1$h$ mode 520 to the EL1$t$ mode 522. As this does not require a change in privilege level, these instructions are not required to be synchronised across the system and therefore can omit the costly branch operation. In 64-bit operation this instruction cannot be used to change privilege level.

Similar instructions, "MSR CPSR" and "CPS" are provided in 32-bit operation to move between modes at the same privilege level. However, in 32-bit operation, these instructions can also be used to move down between privilege levels but never to increase the privilege level, for example, to decrement the privilege level by changing from a privileged 32-bit mode operating at privilege level PL1 420 to the lower privilege of a 32-bit user mode operating at privilege level PL0 410 (see FIG. 4). However, by decrementing privilege level in this way may lead to a software malfunction as the change will not be properly synchronized across the system. If the MSR CPSR or CPS instructions are fetched for execution when the data processing system is in the user mode operating at privilege level PL0 410 (lowest privilege level) then these instructions will simply be ignored.

It is known in the ARM v7 microprocessor architecture to use the MSR CPSR instruction, intended primarily for use in the 32-bit operation of the non-debug mode, as an overloaded instruction that when executed in the debug mode can be used to make any change between privilege levels, including an increase in privilege level e.g. from the user mode 510 at PL0 to the SVC mode 522 corresponding to PL1. In the non-debug mode such changes are not synchronized, and increasing privilege would not be allowed. Hence, by overloading this operation, complications arise in the processor implementation as the change must be synchronized and the normal permission and security checks must be overridden in the debug mode.

FIG. 6 schematically illustrates an instruction encoding for the DCPS instruction that is used to increase the privilege level when the data processing apparatus is in the debug mode. As shown in FIG. 6, the instruction encoding is a 32-bit wide instruction encoding belonging to the A64 instruction set (i.e. instructions that operate on 64-bit data), in which the target privilege level is defined as an immediate field in bits DCPS[1:0] of the instruction the various different values of the two bit fields according to this particular embodiment are defined in the table of FIG. 6. Thus a bit value of DCPS[1:0] =0b01 results in a shift to PL1, a target bit field of DCPS[1: 0]=0b10 results in a target privilege level PL2 and a bit value of DCPS[1:0]=0b11 results in a shift to PL3. This instruction cannot be used to decrease the privilege level from the current privilege level. Note that bits [21:5] of the DCPS instruction are ignored by the data processing circuitry during execution of the instruction.

FIG. 7A schematically illustrates an encoding for the privilege level decrementing instruction DRET used in the debug mode. This DRET instruction encoding is a 32-bit wide instruction encoding belonging to the A64 instruction set.

FIG. 7B schematically illustrates an instruction encoding for the ERET instruction, which is the non-debug mode privilege level decrementing instruction. By comparison of the encodings of the DRET instruction encoding of FIG. 7A and the ERET instruction encoding of FIG. 7B, it can be seen that the DRET instruction and the ERET instruction have isomorphic encodings which means that the instruction encodings have corresponding or similar forms and relations. In particular, bits [23:21] of these two instructions are the only bits that differ between the two instruction encodings. Thus in this particular embodiment, only a single bit, bit [21], out of the total 32-bits of the instruction encoding differs between the debug mode DRET and non-debug mode ERET encodings. It will be appreciated that for isomorphic instruction encodings a larger subset of corresponding bits of the full instruction encoding are identical in their bit values whereas a smaller subset of corresponding bits are non identical in their bit values. Typically as in the case of FIG. 7A and FIG. 7B, the non identical bit portions will be considerably smaller than the identical bit portions. In some embodiments the non-identical bit set of the two isomorphic instruction encodings has a bit set comprising a number of bits of less than one tenth of the bit set corresponding to the identical portion of the instruction encodings. In some embodiments the bit set corresponding to the non-identical portions of the instruction encodings is a single bit, with the bit set corresponding to the identical bits being one less than the full bit-width of the instruction. Note that, as is the case in FIG. 7A and FIG. 7B, the identical bit-width need not be a contiguous bit-width since the identical bit-widths in the instructions of FIG. 7A and FIG. 7B correspond to bit portions [31:24] and [20:0]. To the instruction decoder circuitry (not shown) the order of the bits is immaterial.

FIG. 7C schematically illustrates instructing encodings for the non-debug mode privilege level incrementing instructions SVC, HVC and SMC. These instruction encodings are each 32-bit wide instruction encodings belonging to the A64 instruction set. The first row encoding corresponds to the SVC instruction, the middle row corresponds to the HVC instruction encoding whilst the bottom row corresponds to the SMC instruction encoding. Each of these instructions comprises a comment field that is ignored when decoding the instruction and this comments field corresponds to bits [20:5] of the instructions. Bits [31:21] and [4:2] of these three instructions are identical whilst the lowermost two bits are non-identical. In fact, the lower-most two bits are an immediate field in the encoding that specifies the target exception level. Recall from FIG. 5 that the SVC instruction has a target of privilege level PL1, the HVC instruction has a target privilege level of PL2 whilst the SMC instruction has a target of the highest privilege level PL3. It can be seen by comparison with the DCPS instruction encoding of FIG. 6 and the SVC, HVC and SMC encodings of FIG. 7C that the DCPS instruction has an encoding that is isomorphic to the base encoding of the SVC, HVC and SMC instructions, in that they differ only in two bits [23] and [21]. That is, DCPS with a target of PL1 is isomorphic to SVC, DCPS with a target of PL2 is isomorphic to HVC, and DCPS with a target of PL3 is isomorphic to SMC.

Figure 8:
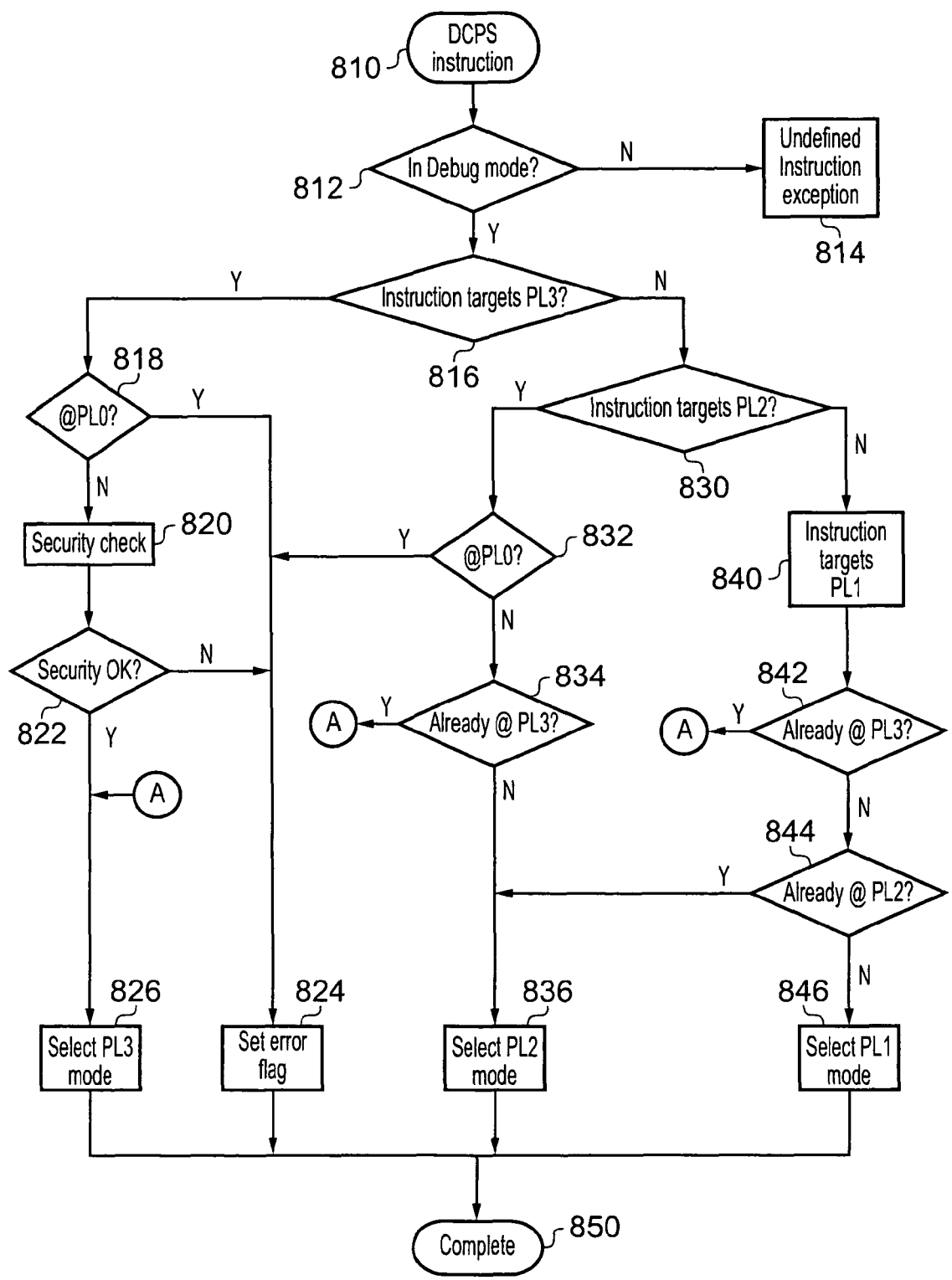
FIG. 8 is a flow chart that schematically illustrates processing operations undertaken by the data processing apparatus of FIG. 1 upon execution of the DCPS debug mode privilege level incrementing instruction.

FIG. 8 is a flow chart that schematically illustrates processing operations undertaken by the data processing apparatus of FIG. 1 upon execution of the DCPS debug mode privilege-level incrementing instruction. The processing begins at stage 810 where the DCPS instruction is executed. The process proceeds to stage 812 where the processor determines whether or not it is in a debug mode. If the processor is not in a debug mode i.e. is in a non-debug mode, then the process proceeds to stage 814, where an undefined instruction exception is thrown. If on the other hand it is determined at stage 812 that the processor is in fact in a debug mode, then the process proceeds to stage 816 where it is determined whether the instruction has a target of privilege level PL3. If the target is not the highest privilege level PL3 then the process proceeds to stage 830, whereas if the instruction does in fact target the highest privilege level PL3 then the process proceeds to stage 818.

At stage 818 it is determined if the current privilege level is PL0, i.e. the processor is at the lowest privilege level. The DCPS operation targeting privilege PL3 is not permitted at PL0, and therefore if at stage 818 it is determined that the current privilege level is PL0, then the process proceeds to stage 824 whereupon an error flag is set and then the process proceeds to completion at stage 850. If on the other hand at stage 818 it is determined that the current privilege level is not privilege level PL0 then the process proceeds to stage 820.

At stage 820 a security check is performed to determine if the requested transition should be permitted and the process then proceeds to stage 822 where the results of the security check are analysed. Because PL3 relates to the highest privilege level, and the route between the non-secure and secure operating states of the data processing apparatus, a security check is performed to ensure that the debugger issuing the DCPS operation is permitted to access the secure operating state. Typically this security check involves checking the state of a configuration input to the debug module 130. If the configuration input is asserted the security check passes, otherwise it fails. This configuration input may be driven in a number of ways, although preferably it is driven by another component within the data processing circuitry 100 so that it cannot be easily tampered with. The component driving the configuration input is responsible for checking the authenticity of the user of the debugger, for example by use of well-known means such as a secret password or challenge-response mechanism.

If the security check is passed at stage 822 and the data processing apparatus is permitted to make a transition from a current privilege level to the PL3 mode then the process proceeds to stage 826 and the PL3 mode of operation of the data processing apparatus is selected whereupon the process proceeds to completion at stage 850. If on the other hand at stage 822 the security check fails indicating that access to the highest privilege level PL3 is not permitted, then the process proceeds to stage 824 whereupon an error flag is set and then the process proceeds to completion at stage 850.

Returning to stage 816, if it is determined at this stage that the instruction does not target the highest privilege level PL3, then the process proceeds from stage 816 to stage 830. At stage 830 it is determined whether or not the instruction targets the privilege level PL2. If the instruction does in fact target privilege level PL2 then the process proceeds to stage 832.

At stage 832 it is determined if the current privilege level is PL0, i.e. the processor is at the lowest privilege level. The operation targeting privilege PL2 is not permitted at PL0, and therefore if at stage 832 it is determined that the current privilege level is PL0, then the process proceeds to stage 824 whereupon an error flag is set and then the process proceeds to completion at stage 850. If on the other hand at stage 832 it is determined that the current privilege level is not privilege level PL0 then the process proceeds to stage 834.

At stage 834 it is determined whether the current privilege level is PL3 i.e. the processor is already at the highest privilege level. If the processor is at PL3 then a target of PL2 would amount to decreasing the privilege level, which cannot be effected using the privilege-level incrementing DCPS instruction. If the processor is already at privilege level PL3 then the process proceeds via the circle labelled "A" in FIG. 8 to stage 826 and the PL3 mode of operation of the data processing apparatus is selected whereupon the process proceeds to completion at stage 850. If on the other hand it is determined that the processor is not at the highest privilege level PL3 at stage 834 then the process proceeds to stage 836 whereupon the PL2 mode is selected. The process then proceeds to completion at stage 850.

If on the other hand it is determined at stage 830 that the instruction does not target privilege level PL2 then the process proceeds to stage 840 where it is deduced that the instruction targets the privilege level PL1. The process then proceeds to stage 842 where it is determined if the processor is at privilege level PL3 which would mean that a transition down to a privilege level PL1 would not be possible. Accordingly, in this case the process would proceed via the circle labelled "A" in FIG. 8 to stage 826 and the PL3 mode of operation of the data processing apparatus is selected whereupon the process proceeds to completion at stage 850. If it is determined at stage 842 that the data processing apparatus is not at PL3 then the process proceeds to stage 844, where it is determined if the processor is at privilege level PL2. If the processor is at PL2 then a target of PL1 would also amount to decreasing the privilege level. Accordingly, in this case the process proceeds to stage 836 whereupon the PL2 mode is selected and then proceeds to completion at stage 850.

Returning to stage 844, if it is determined that the data processing apparatus is not at privilege level PL2, then the process proceeds to stage 846, where the PL1 mode is selected and the process then completes at stage 850. Note that at stage 832, stage 842 and stage 844 no error flag is set if the data processing apparatus is already at the target privilege level, but executing the respective instruction in this state would simply mean that there would be no change in privilege level. It may, though, result in a change of mode since there may be multiple modes at each privilege level.

Figure 9:
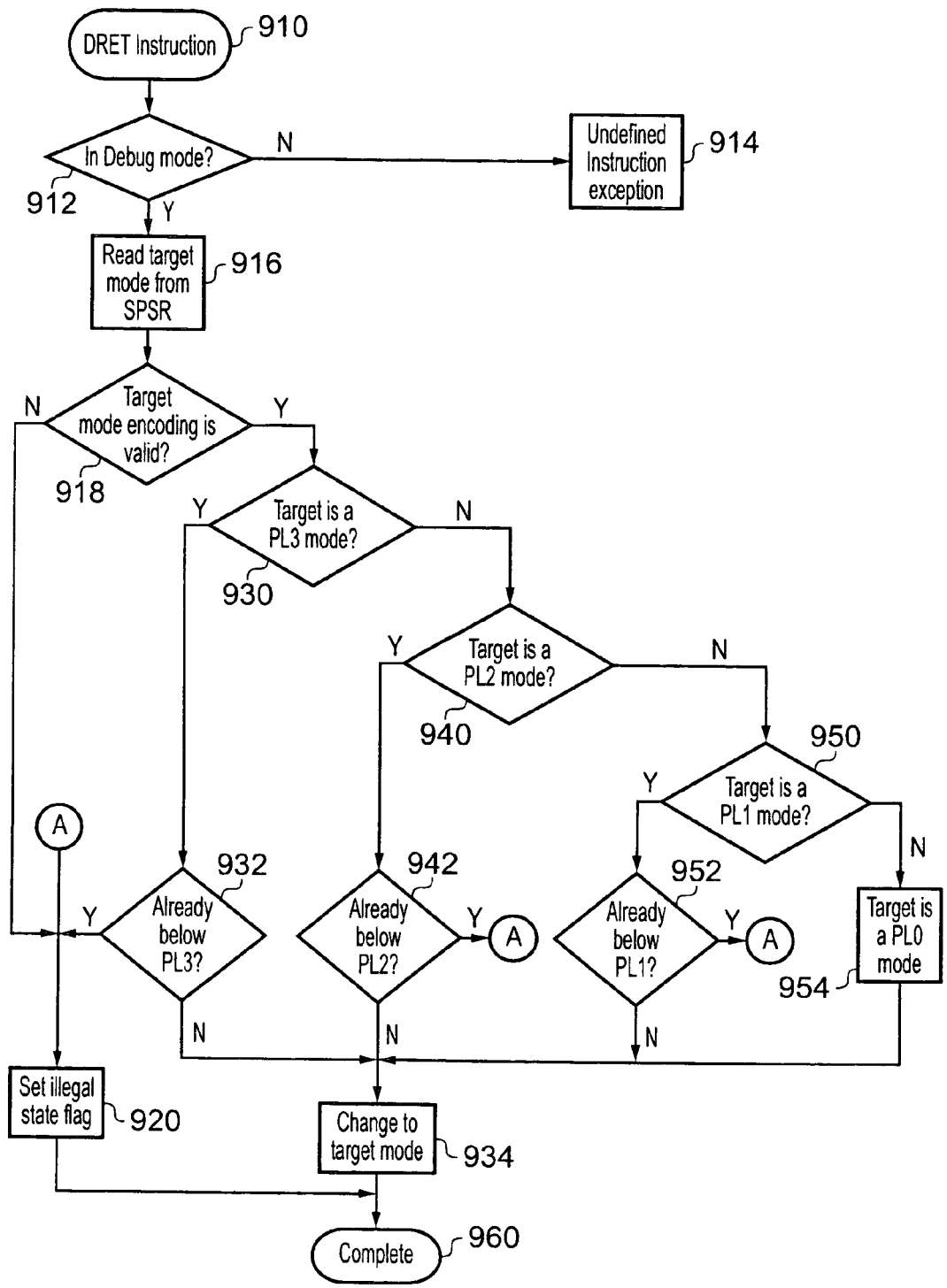
FIG. 9 is a flow chart that schematically illustrates data processing operations performed in response to execution of the debug mode privilege level decrementing instruction DRET.

FIG. 9 is a flow chart that schematically illustrates data processing operations performed in response to execution of the debug mode privilege level decrementing instruction DRET. The process begins at stage 910 where the DRET instruction is executed by the pipeline of FIG. 1. The process then proceeds to stage 912 where it is determined whether or not the processor is in the debug mode. If it is determined that the processor is not in the debug mode at stage 912 then the process proceeds to stage 914, where an undefined instruction exception is thrown. This is because the DRET instruction can be only executed in the debug mode and throws a software exception in a non-debug mode. If on the other hand at stage 912 it is determined that the processor is in the debug mode, then the process proceeds to stage 916 where the target privilege level is read from the appropriate banked saved program status register 143 of FIG. 1. The process then proceeds to stage 918 where it is determined whether or not the target mode encoding is valid.

If the target mode encoding obtained from the saved program status register 143 is not valid then the process proceeds to stage 920 where an illegal state flag is set and then the process completes at stage 960. Note that the illegal state flag of FIG. 9 is different from the error flag of FIG. 8. If on the other hand it is determined at stage 918 that the target mode encoding is in fact valid, then the process proceeds to stage 930 where it is determined whether the privilege level of the target mode is the highest privilege level PL3. If the target mode is determined to be a mode of the highest privilege level PL3 then the process proceeds to stage 932 where it is determined whether the current privilege level is already below PL3. If at stage 932 it is determined that the current privilege level is below PL3 then the process proceeds to stage 920, where the illegal state flag is set and then completes at stage 960. Recall that the DRET instruction cannot be used to increase the privilege level.

If at stage 932 it is determined that the current privilege level is not already below PL3 then the process proceeds to stage 934 where a transition is made to the target PL3 mode. Effectively in this case the system will already be at the privilege level PL3 at stage 932 and the change to the target mode at stage 934 effects no actual change in the current privilege level but results in remaining at the current privilege level. It may, though, result in a change of mode since there may be multiple modes at each privilege level.

If at stage 930 it is determined that the target mode is not a PL3 mode then the process proceeds to stage 940 where it is determined whether the target mode is a PL2 mode. If the target mode is in fact a PL2 mode then the process proceeds to stage 942 where it is determined if the data processing apparatus is currently already below privilege level PL2. If the data processing apparatus is already currently below privilege level PL2 then this will be an invalid transition because it would result in increasing the privilege level and accordingly the process proceeds to the stage 920 via the circle labelled "A" in FIG. 9, where an illegal state flag is set and then completes at stage 960.

At stage 942 if it is determined that the current privilege level is not already below privilege level PL2 then the system must be at PL2 or PL3 and so the process proceeds to stage 934 where a change is made to the target mode and the system will switch to privilege level PL2 as required and the system completes at stage 960.

Returning to stage 940, if instead of determining that the target mode is a PL2 mode at stage 940, it is determined that the target is not a PL2 mode then the process proceeds to stage 950 where it is determined if the target mode is a PL1 mode. If the target mode is found to be a PL1 mode then the process proceeds to stage 952 where it is determined if the current privilege level is in fact already below PL1. If the current privilege level is already below PL1 then this will be an illegal transition since it cannot involve increasing the privilege level and so the process proceeds via the circle labelled "A" whereupon an illegal state flag is set at stage 920 and the process completes at stage 960. If on the other hand it is determined at stage 952 that the current privilege level is not already below privilege level PL1, then the current privilege level must be one of PL3, PL2, or PL1 and the process proceeds to stage 934 where a change to the target PL1 mode i.e. a change to privilege level PL1 is effected as required and the process completes at stage 960.

Returning to stage 950, if it is determined that the target mode is not a PL1 mode then the process proceeds to stage 954 where the target mode is established to be a PL0 mode and then proceeds to stage 934 where a change to the target PL0 mode i.e. a change to privilege level PL0 is effected as required and the processor completes at stage 960.

Figure 10:
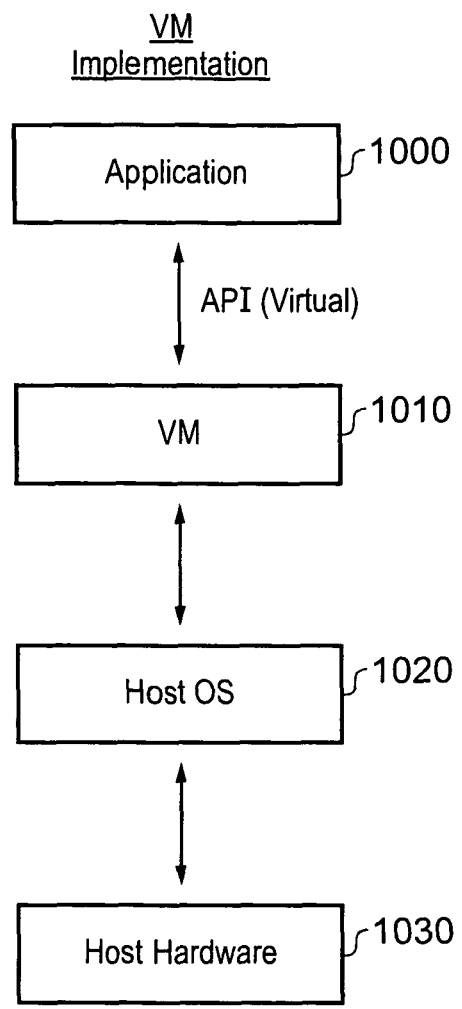
FIG. 10 schematically illustrates an embodiment implemented on a virtual machine.

FIG. 10 illustrates a virtual machine implementation that may be used. Whilst the earlier described embodiments implement the present invention in terms of apparatus and methods for operating specific processing hardware supporting the techniques concerned, it is also possible to provide so-called virtual machine implementations of hardware devices. These virtual machine implementations run on a host processor 1030 running a host operating system 1020 supporting a virtual machine program 1010. Typically, large powerful processors are required to provide virtual machine implementations which execute at a reasonable speed, but such an approach may be justified in certain circumstances, such as when there is a desire to run code native to another processor for compatibility or re-use reasons. The virtual machine program 1010 provides an application program interface to an application program 1000 which is the same as the application program interface which would be provided by the real hardware which is the device being modeled by the virtual machine program 1010. Thus, the program instructions, including the control of memory accesses described above, may be executed from within the application program 1000 using the virtual machine program 1010 to model their interaction with the virtual machine hardware.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

We claim:

1. A data processing apparatus comprising:
   processing circuitry for processing data, said processing circuitry configured to operate at a plurality of privilege levels in one of a debug mode and a non-debug mode wherein at different privilege levels said processing circuitry imposes on program instructions different access permissions to at least one of a memory and a set of registers;
   instruction decoding circuitry, responsive to program instructions, configured to generate control signals for controlling said processing circuitry to perform said data processing;
   wherein said program instructions comprise a debug privilege-level switching instruction, said instruction decoding circuitry, responsive to said debug privilege-level switching instruction, configured:

(i) if said processing circuitry is in said debug mode, to switch said processing circuitry from a current privilege level to a target privilege level while remaining in said debug mode; and (ii) if said processing circuitry is in said non-debug mode, to prevent execution of said debug privilege-level switching instruction regardless of said current privilege level.

2. The data processing apparatus according to claim 1, wherein said target privilege level is different from said current privilege level.

3. The data processing apparatus according to claim 1, wherein said target privilege level is encoded within a field of said debug privilege-level switching instruction.

4. The data processing apparatus according to claim 1, comprising at least one dedicated target register providing an indication of said target privilege level and wherein said debug privilege-level switching instruction reads said indication of said target privilege level from said dedicated target register.

5. The data processing apparatus according to claim 4, comprising a plurality of said dedicated target registers, each of said dedicated target registers storing a corresponding target privilege level and wherein said processing circuitry is configured to select one of said plurality of dedicated target registers from which to read said target privilege level depending upon said current privilege level.

6. The data processing apparatus according to claim 1, wherein said debug privilege-level switching instruction comprises a privilege-incrementing instruction and wherein said target privilege level is required to correspond to a higher privilege level than said current privilege level.

7. The data processing apparatus according to claim 1, wherein said debug privilege-level switching instruction comprises a privilege-decrementing instruction and wherein said target privilege level is required to correspond to a lower privilege level than said current privilege level.

8. The data processing apparatus according to claim 1, wherein said program instructions comprise a first type of debug privilege-level switching instruction corresponding to a privilege-incrementing instruction for which said target privilege level is required to correspond to a higher privilege level than said current privilege level and a second type of debug privilege-level switching instruction corresponding to a privilege-decrementing instruction for which said target privilege level is required to correspond to a lower privilege level than said current privilege level.

9. The data processing apparatus according to claim 1, wherein said program instructions comprise a standard privilege-level switching instruction, said instruction decoding circuitry being responsive to said standard privilege-level switching instruction to perform the following:

(i) if said processing circuitry is in a non-debug mode to switch said processing circuitry from said current privilege level to said target privilege level.

10. The data processing apparatus according to claim 9, wherein said debug privilege-level switching instruction and said standard privilege-level switching instruction have identical instruction bit-widths and isomorphic encodings and wherein said isomorphic encodings are implemented such that a first bit-set of said debug privilege-level switching instruction and said standard privilege-level switching instruction have substantially identical bit patterns whilst a second bit-set of said debug privilege-level switching instruction and said standard privilege-level switching instruction have substantially non-identical bit patterns and wherein said second bit-set is less than said first bit set.

11. The data processing apparatus according to claim 10, wherein said second bit-set comprises a single bit.

12. The data processing apparatus according to claim 1, wherein said current privilege level corresponds to an operating state of said processing circuitry that implements a first virtual memory address to physical memory address translation scheme and said target privilege level corresponds to an operating state of said processing circuitry that implements a second virtual memory address to physical memory address translation scheme and wherein said first virtual memory address to physical memory address translation scheme is different from said second virtual memory address to physical memory address translation scheme.

13. The data processing apparatus according to claim 1, wherein said data processing circuitry comprises a plurality of system registers and wherein at said current privilege level a first set of accessibility criteria is associated with said plurality of system registers, whilst at said target privilege level a second set of accessibility criteria is associated with said plurality of system registers and wherein said second set of accessibility criteria is different from said first set of accessibility criteria.

14. The data processing apparatus according to claim 1, wherein if said data processing circuitry is in said non-debug mode, said debug privilege-level switching instruction is undefined and generates a software exception.

15. The data processing apparatus according to claim 1, wherein a first of said plurality of privilege levels corresponds to an application layer and a second of said plurality of privilege levels corresponds to an operating system layer.

16. The data processing apparatus according to claim 1, wherein one of said plurality of privilege levels corresponds to a hypervisor layer.

17. The data processing apparatus according to claim 1, wherein one of said plurality of privilege levels corresponds to a security monitoring layer.

18. The data processing apparatus according to claim 15, wherein a third one of said privilege levels corresponds to a security monitoring layer and wherein a hypervisor layer is absent.

19. The data processing apparatus according to claim 1 and, wherein said debug privilege-level switching instruction is configured to trigger a check prior to implementing said switch to determine whether said switch from said current privilege level to said target privilege level should be permitted and to prevent said switch from said current privilege level to said target privilege level when said check fails.

20. The data processing apparatus according to claim 19, wherein said target privilege level corresponds to a security-monitoring layer and wherein said check is a security check.

21. The data processing apparatus according to claim 19, wherein said processing circuitry is configurable such that in a higher one of said plurality of privilege levels, said processing circuitry can define at least one lower one of said plurality of privilege levels to be inaccessible and wherein said check is an accessibility check for permitted accessibility to said target privilege level.

22. A virtual machine provided by a computer program stored on a non-transitory computer readable storage medium and said program, when executed by a data processing apparatus, said virtual machine provides an instruction execution environment according to the data processing apparatus as claimed in claim 1.

23. A data processing apparatus comprising:

means for processing data, said means for processing data configured to operate at a plurality of privilege levels in one of a debug mode and a non-debug mode wherein at different privilege levels said means for processing data has different access permissions to at least one of a memory and a set of registers;

means for decoding program instructions responsive to program instructions to generate control signals for controlling said means for processing to perform said data processing;

wherein said program instructions comprise a debug privilege-level switching instruction, said means for decoding program instructions, responsive to said debug privilege-level switching instruction, configured to perform:

(i) if said means for processing data is in said debug mode, to switch said means for processing data from a current privilege level to a target privilege level while remaining in said debug mode; and (ii) if said means for processing data is in said non-debug mode, to prevent execution of said debug privilege-level switching instruction regardless of said current privilege level.

24. A data processing method for performing on a data processing apparatus having processing circuitry configured to operate at a plurality of privilege levels in one of a debug mode and a non-debug mode wherein at different privilege levels said processing circuitry has different access permissions to at least one of a memory and a set of registers, said data processing method comprising the steps of:

in response to program instructions including a debug privilege-level switching instruction, generating control signals for controlling processing circuitry to process data;

in response to said debug privilege-level switching instruction, generating control signals for controlling said processing circuitry to perform a privilege-level switching operation:

(i) if said processing circuitry is in said debug mode, switching said processing circuitry from a current privilege level to a target privilege level while remaining in said debug mode; and (ii) if said processing circuitry is in said non-debug mode, preventing execution of said debug privilege-level switching instruction regardless of said current privilege level.

25. A computer program product including a non-transitory computer readable storage medium storing program instructions which, when implemented on a data processing apparatus, implements the method of claim 24.

* * * * *